US008250666B2

(12) United States Patent
Karabulut et al.

(10) Patent No.: US 8,250,666 B2
(45) Date of Patent: Aug. 21, 2012

(54) METHOD AND APPARATUS FOR IMPROVING SECURITY IN AN APPLICATION LEVEL VIRTUAL MACHINE ENVIRONMENT

(75) Inventors: Yuecel Karabulut, Milpitas, CA (US); Juergen Schmerder, San Mateo, CA (US)

(73) Assignee: SAP AG, Walldorf (DE)

( * ) Notice: Subject to any disclaimer, the term of this patent is extended or adjusted under 35 U.S.C. 154(b) by 1083 days.

(21) Appl. No.: 12/167,915

(22) Filed: Jul. 3, 2008

(65) Prior Publication Data

US 2010/0005449 A1    Jan. 7, 2010

(51) Int. Cl.
*G06F 21/00*    (2006.01)
(52) U.S. Cl. .......... 726/29; 719/328; 719/329; 719/330; 719/331; 719/332; 717/120; 726/26
(58) Field of Classification Search .......... 717/152–154, 717/162; 726/1, 26, 29
See application file for complete search history.

(56) References Cited

U.S. PATENT DOCUMENTS

| 6,446,111 | B1* | 9/2002 | Lowery | 709/203 |
|---|---|---|---|---|
| 6,584,186 | B1* | 6/2003 | Aravamudan et al. | 379/201.03 |
| 7,401,219 | B2* | 7/2008 | Aho et al. | 713/165 |
| 7,945,921 | B2* | 5/2011 | Quinn | 719/332 |
| 2001/0003824 | A1* | 6/2001 | Schnier | 709/203 |
| 2007/0043860 | A1* | 2/2007 | Pabari | 709/224 |
| 2007/0234321 | A1* | 10/2007 | Mcdowali | 717/141 |
| 2008/0313257 | A1* | 12/2008 | Allen et al. | 709/201 |

OTHER PUBLICATIONS

Johannes Helander & Alessandro Forin Pub Sep. 1998—MMLite: A Highly Componentized System Architecture.*
U.S. Appl. No. 11/935,285, Rainer Brendle.
Almut Herzog and Nahid Shahmehri, "Problems Running Untrusted Services as Java Threads," In Certification and Security in Inter-Organizational E-Services. pp. 19-32. Springer Verlag. 2005.
White Paper. "6.1 Memory Allocation and Layout," The Java Language Environment. 1997, Sun Microsystems, Inc.
White Paper. "6.4 Security in the Java Networking Package," The Java Language Environment. 1997, Sun Microsystems, Inc.
Qusay H. Mahmoud, Java Authentication and Authorization Service (JAAS) in Java 2, Standard Edition (J2SE) 1.4, Sep. 3, 2003.
White Paper. "6.2 Security Checks in the Class Loader," The Java Language Environment.1997, Sun Microsystems, Inc.
White Paper. "6.5 Summary," The Java Language Environment. 1997, Sun Microsystems, Inc.
White Paper. Java(TM) Security Overview. Apr. 2005.
White Paper. "6.3 The Byte Code Verification Process," z 6.3.1 The Byte Code Verifier, The Java Language Environment. 1997, Sun Microsystems, Inc.
White Paper. "Chapter 6," The Java Language Environment. 1997, Sun Microsystems, Inc.

* cited by examiner

*Primary Examiner* — Jung Kim
*Assistant Examiner* — Tri Tran
(74) *Attorney, Agent, or Firm* — Fountainhead Law Group PC (57) ABSTRACT

In one embodiment the present invention includes a security manager for managing security in a dynamic programming environment. The security manager interfaces between the dynamic programming environment and a non-dynamic programming environment. In this manner, the dynamic programming environment is unable to compromise the non-dynamic programming environment, yet still provide features desirable in a dynamic programming environment. An example using Ruby in a robust business programming environment is detailed.

20 Claims, 9 Drawing Sheets

BAdI accesses information for which user has no permission 402

BAdI exposes information 404

METHOD AND APPARATUS FOR IMPROVING SECURITY IN AN APPLICATION LEVEL VIRTUAL MACHINE ENVIRONMENT

CROSS REFERENCE TO RELATED APPLICATIONS

Not applicable.

BACKGROUND

The present invention relates to security in an application-level virtual machine environment, and in particular, to improving security using controlled bridges.

Unless otherwise indicated herein, the approaches described in this section are not prior art to the claims in this application and are not admitted to be prior art by inclusion in this section.

Programming languages may be broadly categorized into two types: dynamic programming languages and non-dynamic programming languages. A non-dynamic language may be thought of as a programming language where the binding between method (or procedure) calls to the implementing methods happens at compile time. A dynamic language may be thought of as a programming language where the binding happens at runtime and usually can be overwritten in the program at any time. In non-dynamic languages, the method calls may be calls to procedures, which are assigned to classes. In dynamic languages, a method call may be a message to be sent to an instance of a class, and it is the task of the class to decide what to do with the message.

More specifically, the term "dynamic programming language" describes a class of high level programming languages that execute at runtime many common behaviors that other languages might perform during compilation, if at all. These behaviors could include extension of the program, by adding new code, by extending objects and definitions, or by modifying the type system, all during program execution. These behaviors can be emulated in nearly any language of sufficient complexity, but dynamic languages provide direct tools to make use of them. The term "non-dynamic programming language" describes languages that lack these behaviors. (Non-dynamic programming languages may also be referred to as "static programming languages" or "robust programming languages".)

Dynamic programming languages have a number of benefits, either actual or perceived. They are flexible, for example, by allowing dynamic typing of variables, and giving the ability to change code and logical structures at runtime. Many dynamic languages are open source languages. Dynamic languages allow for high productivity, for example, being easy to learn and having a straightforward syntax. Dynamic languages often allow for easier integration, for example in environments such as mashups or other web services.

An example of a dynamic language is Ruby. Ruby is a reflective, dynamic, object oriented programming language. It combines syntax inspired by Perl with Smalltalk-like object oriented features, and also shares some features with Python, Lisp, Dylan, and CLU. Ruby is a single pass interpreted language.

However, dynamic languages have a number of drawbacks in certain computing environments. For example, the ability to change the program code during program execution is generally a strength, but is a drawback in the business applications environment. For business applications, it is generally undesirable for the programs of one user to affect the programs or data of another user. Business applications must be generally "robust", where programs from different users are kept isolated, limiting the potential to create damage to other users' programs, to the server, or to the underlying business data.

Such problems are not solved by implementing dynamic languages in the Java® language, for example, because the Java® language has no thread level isolation. For further details, see for example Almut Herzog and Nahid Shahmehri, "Problems Running Untrusted Services as Java Threads", CSES 2004 2nd International Workshop on Certification and Security in Inter-Organizational E-Services (2004).

Furthermore, if there is interaction between a dynamic programming environment and a non-dynamic programming environment, there arises the possibility of compromised security via the interaction.

Thus, there is a need for improved security in dynamic programming environments. The present invention solves these and other problems by providing security solutions for bridges between a dynamic programming environment and a robust programming environment.

SUMMARY

Embodiments of the present invention improve the security relationship between dynamic and non-dynamic programming environments. According to one embodiment, a security framework implemented in a domain specific declarative policy language allows system/security administrators to define security policies where each policy expresses which built-in operations are forbidden to be used in which application context and bridge. The security policy language uses a built-in (i.e., an extension library) which is a secure bridge itself. According to a further embodiment, the code for expressing the security policy is written in Ruby. The administrator then may use the Eclipse environment (for example) to upload the policies to the policy base which may be implemented as a database table in a non-dynamic programming environment (such as the ABAP™ environment).

In one embodiment, the present invention includes a computer-implemented method of maintaining security in a dynamic programming environment. The computer-implemented method includes defining a policy between the dynamic programming environment and a non-dynamic programming environment. The method further includes, at runtime of a dynamic program in the dynamic programming environment, when the dynamic program indicates access to an application managed by the non-dynamic programming environment, referencing the policy to permit the dynamic program to access the application. The method further includes executing the dynamic program to access the application having been permitted.

According to other embodiments, the computer-implemented method may be implemented by a computer system, or may be executed as a computer program that is embodied on a tangible recording medium.

According to a further embodiment, the policy may itself be defined by a dynamic program.

According to a further embodiment, a security manager may perform various details, such as accessing the policy and aborting the dynamic program when the policy conflicts with the dynamic program.

According to a further embodiment, the dynamic program may access a number of applications, access to each of which may be controlled by the policies.

Thus, one embodiment of the present invention allows administrators to define the scope of Virtual Machine instantiations for different application contexts via the generation of restricted VMs based on the defined policies.

According to a further embodiment, add-in programs written in the dynamic programming environment may be accessed by the non-dynamic programming environment via a registration process.

The following detailed description and accompanying drawings provide a better understanding of the nature and advantages of the present invention.

DETAILED DESCRIPTION

Described herein are techniques for improving security in a virtual machine environment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described below are various computer-implemented methods and computer programs. These are referred to by various names, including computer processes, programs, modules, software, and software files. When computer programs as such are discussed, they are embodied on a tangible recording medium.

Described below are various methods. Although a particular method might have method steps described in a particular order, such description is mainly for clarity of presentation. The order may vary and method steps may be performed in parallel, as desired according to various embodiments. When a particular method step is required to precede or follow another, such order will be apparent from the context or specifically noted.

Embodiments of the present invention may be used with embodiments described in U.S. application Ser. No. 11/935,285 filed Nov. 5, 2007 and titled "System and Method of Executing a Dynamic Program in a Structured Environment". U.S. application Ser. No. 11/935,285 describes an example of a specific implementation of a non-dynamic programming environment of the ABAP™ programming language that provides a robust environment for executing dynamic programs written in Ruby. The ABAP™ language is a high level programming language created by SAP AG. It is currently positioned, alongside the more recently introduced Java, as the language for programming SAP's Web Application Server product, part of SAP's NetWeaver™ platform for building business applications.

One goal of the Blue Ruby project is to create an enterprise applications development environment that combines the ease and simplicity of programming in a dynamic programming language—like Ruby—together with the enterprise capabilities of the NetWeaver™ Application Server. Blue Ruby enables developers to run Ruby on the ABAP™ stack of the NetWeaver™ Application Server in a controlled way. The communication between Ruby world and ABAP™ world happens through bridges. Using these bridges, Ruby developers are able to both consume data managed by ABAP™ applications and also extend ABAP™ applications. As the Blue Ruby bridges are the only entry points to the underlying ABAP™ applications and their data, these bridges can be used to attack the applications and their data base. In order to prevent possible attack scenarios, which make use of bridges, a security approach (called Blue Sec) is used to realize "controlled bridges". Only through carefully controlled bridges is Ruby code able to access services/APIs provided by the NetWeaver™ Application Server, ABAP™ applications running on the same server and their data stored in the underlying database. This document presents the Blue Sec approach in detail.

Section 1. Introduction

Developers are under continued pressure to deliver applications faster to keep up with the needs of the businesses that they serve. The use of dynamic languages, together with powerful-yet-simple frameworks for rapidly building web applications, has recently gained significant traction as a way of meeting these challenges.

One goal of the Blue Ruby project is to create an enterprise applications development environment that combines the ease and simplicity of programming in a dynamic programming language—like Ruby—together with the enterprise capabilities of the NetWeaver™ Application Server.

Blue Ruby enables developers to run Ruby on the ABAP™ stack of the NetWeaver™ Application Server in a controlled way. In the first place, Blue Ruby is a Ruby Virtual Machine that runs inside the NetWeaver™ Application Server (ABAP™ Stack), but is completely isolated. This means, Blue Ruby code cannot make use of any services/APIs provided inside the same ABAP™ Server. Blue Ruby's application level virtual machine approach prevents Ruby code to break the application server by causing any wanted or unwanted side effects to ABAP™ applications and their data stored in the underlying database. However, the full power of Blue Ruby only shows when integrating Ruby code with the surrounding ABAP™-based environment. Therefore, Blue Ruby offers several bridges to the ABAP™ world. Using these bridges, Ruby developers are able to both consume data managed by ABAP™ applications and also extend ABAP™ applications.

As the Blue Ruby bridges are the only entry points to the underlying ABAP™ applications and their data, the bridges can be used to attack these applications and their data base. In order to prevent the attack scenarios which make use of bridges, a secure sandboxing approach (called Blue Sec) is being used to realize "controlled bridges". Only through carefully controlled bridges is Ruby code able to access services/APIs provided by the Application Server, ABAP™ applications running on the same server and their data stored in the underlying database. The idea behind the secure bridges is to open up Blue Ruby for communication with ABAP™ Applications—but only in a very controlled way.

The rest of the document is structured as follows: Section 2 gives an overview of Blue Ruby. In section 3 a security framework (Blue Sec) is presented with its components for policy specification, policy upload and policy enforcement. Section 4 concludes the general Blue Sec discussion. Subsequent sections discuss further embodiments.

Section 2. Revisiting Blue Ruby

Blue Ruby provides a novel technology which enables developers to run Ruby on the ABAP™ stack of the NetWeaver™ Application Server.

Figure 1:
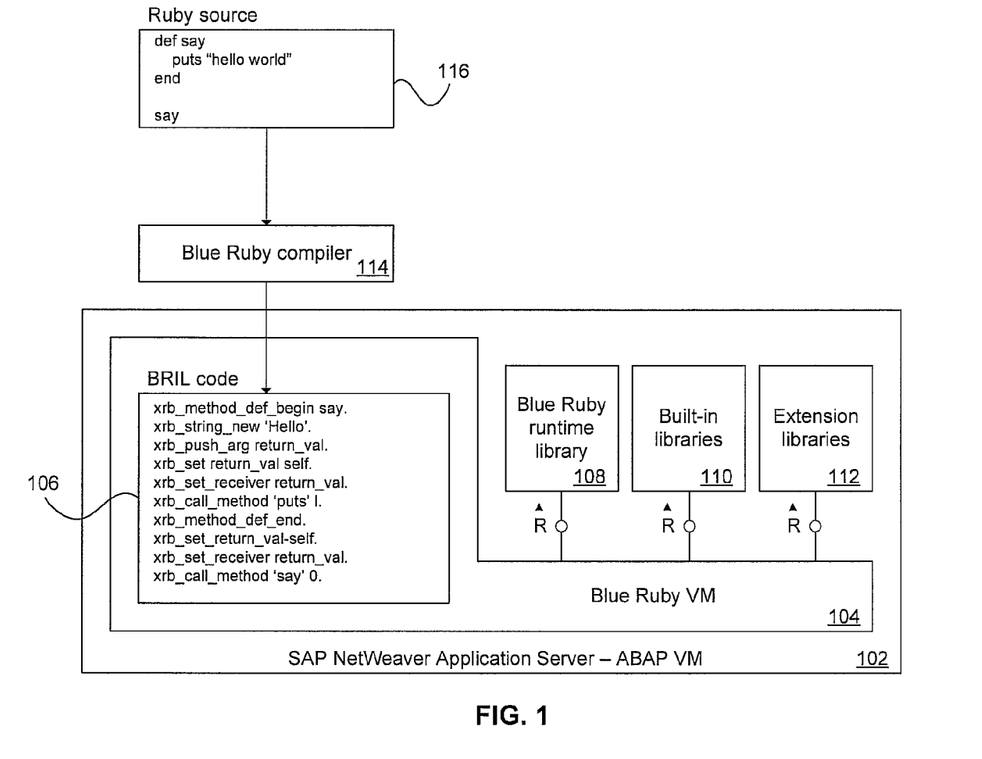
FIG. 1 is a block diagram showing a high level view of Blue Ruby.

FIG. 1 is a block diagram showing a high level view of Blue Ruby, including a ABAP™ virtual machine 102, a Blue Ruby virtual machine 104, Blue Ruby intermediate language (BRIL) code 106, a Blue Ruby runtime library 108, built-in libraries 110, extension libraries 112, a Blue Ruby compiler 114, and Ruby source code 116. Further details regarding these components can be found in U.S. application Ser. No. 11/935,285 as discussed above.

More particularly regarding embodiments of the present invention, the Blue Ruby virtual machine 104 handles program loading, method invocation, control and data flow. Everything is an object in Ruby; therefore the basic operations of the Blue Ruby virtual machine 104 are in creating objects and sending messages to them.

The runtime library 108 enables the Ruby type system and provides the basic structure and relationships between classes, modules, methods and object instances and their lifetime.

The built-in libraries 110 are predefined operations on the base data types such as strings and numbers.

The extension libraries 112 are further extensions that may be wholly or partially implemented in the ABAP™ language.

Secured bridge packages (not shown) allow access (by the Blue Ruby virtual machine 104) to the functionality of the underlying host platform (of the ABAP™ virtual machine 102) in a secure way by establishing a well defined sandbox concept.

The Ruby code 116 is first compiled into an intermediate representation called the Blue Ruby Intermediate Language (BRIL) 106. BRIL-codes are to Blue Ruby what Java™ bytecode is to the Java™ language. The BRIL codes are then loaded into the ABAP™ system using the normal ABAP™ load facility. By building certain extensions on top of the ABAP™ VM 102 (this is the Blue Ruby VM 104) those BRIL codes are then able to be executed in a similar fashion to how ABAP™ loads (the equivalent of bytecode for ABAP™) are normally executed by the ABAP™ VM 102.

Figure 2:
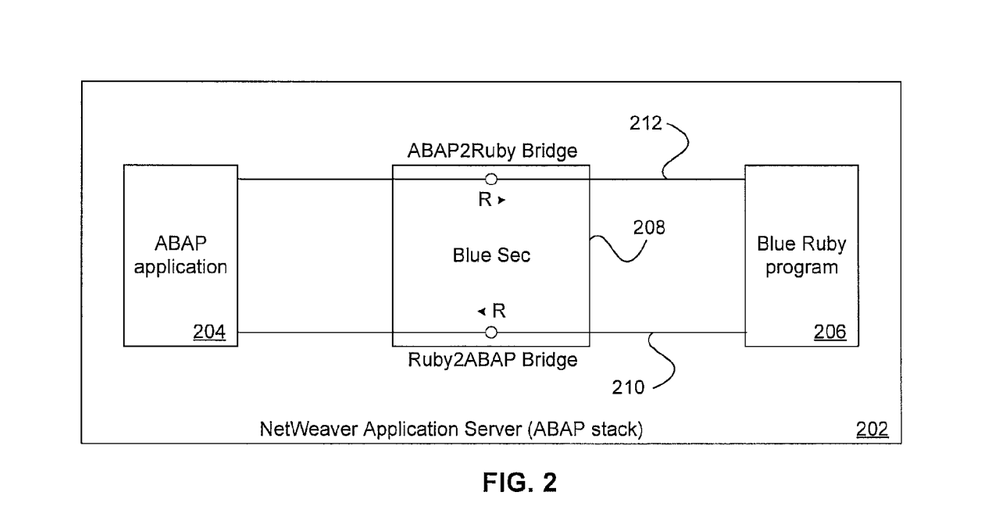
FIG. 2 is a block diagram showing the positioning of a security manager in an embodiment of the present invention.

Blue Ruby offers several bridges to the ABAP™ world—using these bridges, Ruby developers are able to both consume data managed by ABAP™ applications and also extend ABAP™ applications—Blue Ruby comes with a 2-way integration where Ruby can call certain ABAP™ APIs (e.g. Remote Function Calls [RFCs]) and ABAP™ can also call Ruby code, as illustrated in FIG. 2.

FIG. 2 is a block diagram showing the positioning of a security manager in an embodiment of the present invention. The NetWeaver™ Application Server 202 (the ABAP™ stack) implements an ABAP™ application 204, a Blue Ruby program 206, and the Blue Sec security manager 208. A Ruby2ABAP bridge 210 interfaces through the Blue Sec security manager 208 from the ABAP application 204 to the Blue Ruby program 206. An ABAP2Ruby bridge 212 interfaces through the Blue Sec security manager 208 to the ABAP application 204 from the Blue Ruby program 206.

However, this 2-way integration is not an arbitrary one—Blue Ruby cannot make calls to any piece of ABAP™ code residing on the NetWeaver™ Application Server and especially Blue Ruby is not able to modify the database directly. Instead, communication with the ABAP™ application is only possible via well-defined interfaces—the bridges 210 and 212. The idea behind this restriction is to open up Blue Ruby for communication with ABAP™ Applications—but only in a very controlled way that protects the Ruby developer from breaking the underlying platform.

Blue Ruby Bridges are implemented as libraries, which can be included into a Ruby program via the require statement. E.g. to make RFC calls, one would simply include the relevant bridge by calling 'require Rfc' in the Ruby program—this will offer a class for executing RFC-enabled function modules and passing along the parameters.

The Ruby environment establishes a secured sandbox model, in which a Ruby program can access ABAP™ functionality via well-defined and controlled bridges. This goal is achieved using secure bridges. In the following section is presented a method for realizing secure bridges in an application level virtual machine environment. The regulated communication between Blue Ruby programs and ABAP™ applications is achieved via Blue Sec security manager 208, as illustrated in FIG. 2 and explained in Section 3.

Section 3. Blue Ruby Security Approach

As discussed above, only through carefully controlled "bridges" is Ruby code able to access services/APIs provided by the NetWeaver™ Application Server, ABAP™ applications running on the same server and their data stored in the underlying database. The idea behind the secure bridges is to open up Blue Ruby for communication with ABAP™ Applications—but only in a very controlled way.

Figure 3:
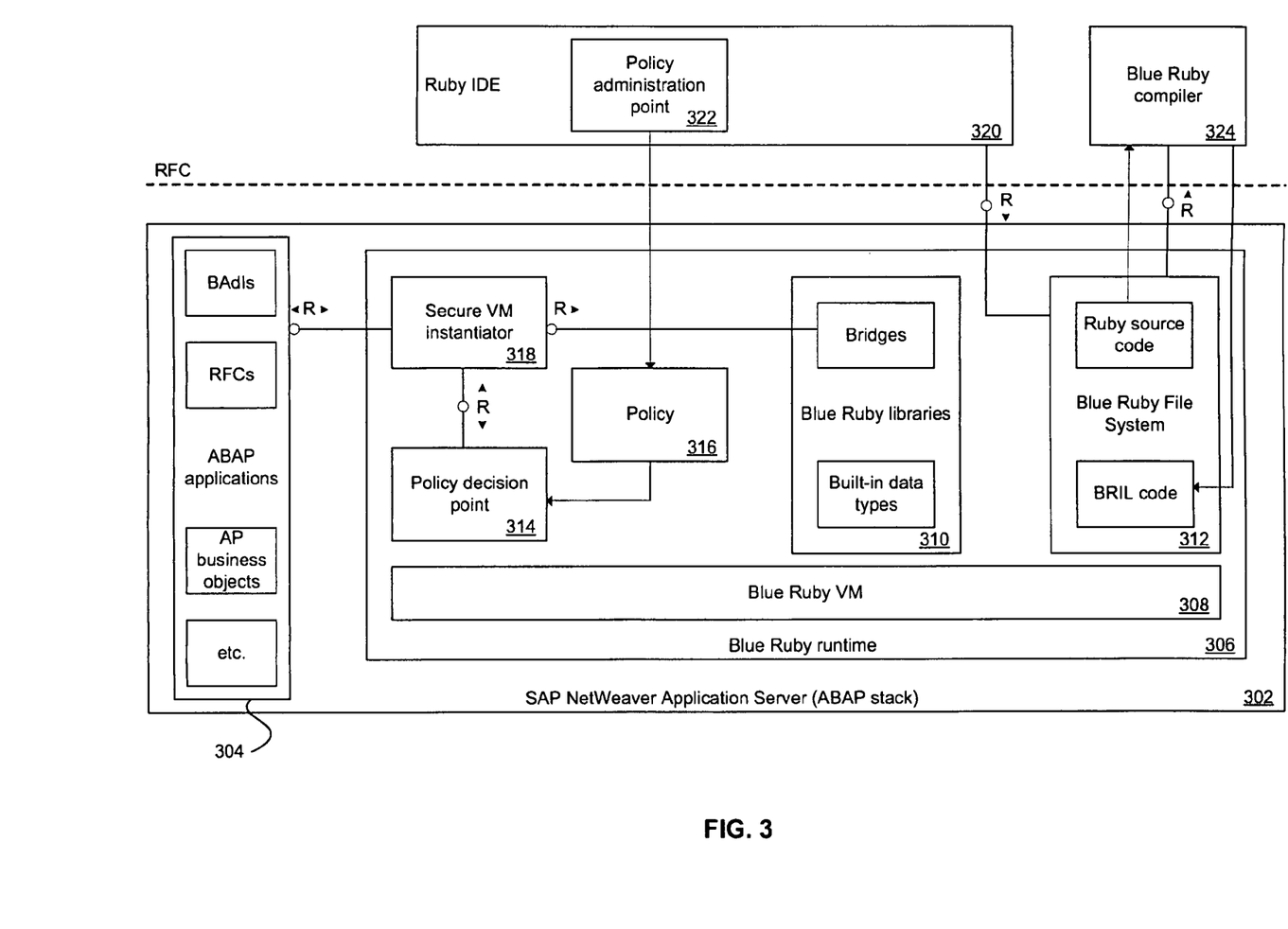
FIG. 3 is a block diagram illustrating various Blue Sec components within the high-level Blue Ruby architecture according to an embodiment of the present invention.

FIG. 3 is a block diagram illustrating various Blue Sec components within the high-level Blue Ruby architecture. (Some of these elements may also be seen in FIG. 1.) The SAP NetWeaver™ application server 302 implements the ABAP™ stack, including various ABAP™ applications such as business add-ins (BAdIs), remote function calls (RFCs), and AP business objects. The SAP NetWeaver™ application server 302 also implements the Blue Ruby runtime 306, which includes the Blue Ruby virtual machine 308, the Blue Ruby libraries 310, and the Blue Ruby file system 312.

The Blue Ruby libraries 310 include the secured bridges as well as the built-in data types (see also the libraries 108, 110 and 112 in FIG. 1). The Blue Ruby file system 312 includes the Ruby source code and the BRIL code.

The Blue Ruby runtime 306 also implements the secure VM instantiator 318, the policy 316, and the policy decision point 314 (also referred to as the security manager 314). The policy 316 may include one or more policies (as further detailed in a subsequent section). As further detailed below, the security manager 314 acts as the "policy decision point", which is responsible for checking in which application type the loaded built-in type is being requested to be used. The secure VM instantiator 318 is the code which is invoking the security manager 314. The VM instantiator 318 may correspond to the code implementing the "require" module. The VM instantiator 318 calls the security manager 314, and this in turn checks the policies and returns either "granted" or "denied". The VM instantiator 318 is then enforcing this decision.

The Ruby IDE 320 and the Blue Ruby compiler 324 may interact with the ABAP™ stack 302 via remote function calls. Alternatively, the interaction may be via HTTP. The interaction may include the function of uploading code. The Ruby IDE 320 includes a policy administration point 322 for interacting with the policies 316. The Blue Ruby compiler 324 may be implemented in various computer languages, including the Java® language, the C language, the ABAP™ language, and the Ruby language.

When executing a Blue Ruby program, the Blue Ruby Runtime 306 checks whether the code attempts to use protected resources. For this purpose, the Blue Ruby runtime 306 will invoke Blue Sec's security manager (policy decision point 314) that will check whether the code has permissions needed for the attempted access. In the positive case, the Blue Ruby runtime 306 permits access; otherwise, it denies access. A Blue Ruby system administrator can set policies programmatically from an integrated development environment (IDE) (such as Eclipse) using a dedicated domain specific language (DSL). A policy object 316 encapsulates the policy and a security manager object 314 enforces it. This means you can implement different security policies as needed, simply by customizing these objects.

Example Attack Scenarios

In this subsection two attack scenarios are considered in the context of Blue Ruby Business Add In (BAdI) implementations. A BAdI implementation technically has the opportunity to extend an ABAP™ application with arbitrary functionality as long as the BAdI interface restrictions are complied with. Since the functionality that a BAdI may implement in ABAP™ is not restricted in any way, a BAdI developer can program an insider attack by using a BAdI implementation. Fortunately, the BAdI implementations in Ruby in general cannot exploit this attack surface, as the BAdI code runs inside the Blue Ruby VM 308. However, a Ruby BAdI implementation can use Blue Ruby built-ins in order to access services and applications running on the same server and their data.

Figure 4:
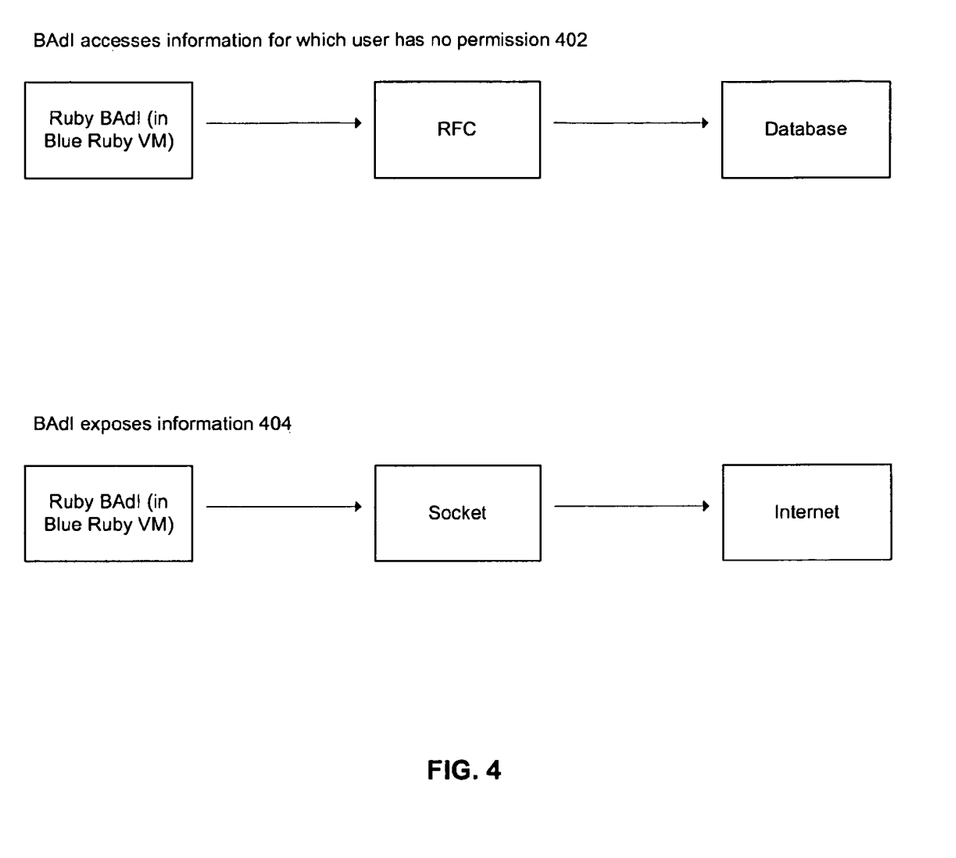
FIG. 4 illustrates two major attack scenarios.

FIG. 4 illustrates two major attack scenarios. In the first attack scenario 402, a BAdI implementation may try to use a specific Built-in in order to access Enterprise Resource Planning (ERP) objects. In the second attack scenario 404, a BAdI may disclose confidential information to an unsecured domain outside the company such as to applications running outside company security domain. The current Blue Sec approach, as presented below, has been developed to prevent the attack scenarios described above and depicted in FIG. 4.

Blue Sec Policy Specification and Upload

In order to specify Blue Ruby security policies a DSL was designed which is realized as a Blue Ruby built-in called "SecurityPolicy". This is an extension library which is a secure bridge itself. A system administrator may use this bridge and configure the policy data base by writing a Ruby program that is executed by the Blue Ruby VM. (See, for example, the structures of FIG. 3 and related discussion.)

The following example Ruby program defines a security policy that disallows BAdIs to load or respectively to use RFC built-ins in the Ruby implementations of BAdIs.

require 'SecurityPolicy'
    SecurityPolicy.clean
    SecurityPolicy.deny("BAdI","RFC","load")

In abstract terms, this access control policy maps from a set of properties that characterize running BAdI code to a set of access permissions forbidden to the concerned code. (These properties may be referred to as "execution properties".)

The "clean" method deletes the existing security policies in the policy database and "deny" adds a new negative permission rule into the policy base.

The policy administrator may use a Policy Administration Point, which may be implemented as an Eclipse plug-in, to upload security policies (see FIG. 3).

Figure 5:
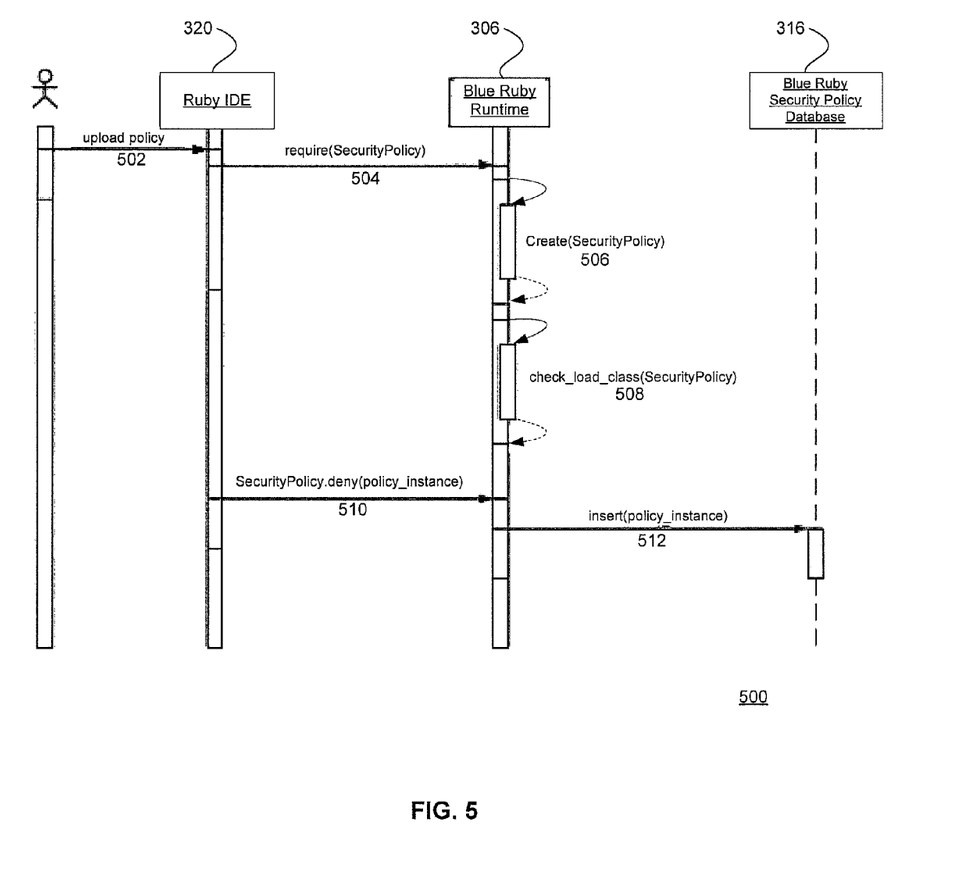
FIG. 5 is a workflow diagram that illustrates the policy upload process according to an embodiment of the present invention.

FIG. 5 is a workflow diagram that illustrates the policy upload process 500. In step 502, the user uploads the policy into the Ruby IDE 320. In step 504, the Ruby IDE 320 contacts the Blue Ruby runtime 306 to load the built-in (bridge) "Security Policy", which will be used to upload policies. In step 506, the Blue Ruby runtime 306 creates the builtin "Security Policy". In step 508, the Blue Ruby runtime 306 checks whether loading the created builtin "Security Policy" violates the existing policies. If loading this built-in into the VM doesn't cause any security violations, the builtin can now be used to upload policies. In step 510, the Ruby IDE 320 uses the "deny" method of the built-in "Security Policy" to create a policy instance. In step 512, the Blue Ruby runtime inserts that policy instance into the Blue Ruby security policy database as a negative policy.

The security policy base is stored in a database table which has the following structure: <subject_type, subject_name, resource_type, resource_name, operation_type, operation_name, permission>. Instead of using a traditional 3-tuple <subject, object, operation> policy base, a policy schema is introduced which allows administrators to define different types of subjects, objects (resources) and operations. Our policy schema also allows the specification of positive (+) or negative (−) policies. For this purpose the <permission> field may be used. Currently, the default authorization policy type is negative. This means all policy rules are to be interpreted as negative policies. Consider the following subject, object and operation types:

Subject types: user, group, application (e.g. BAdI)
Object types: class (e.g. a Built-in class such as RFC), and method (e.g. a method of a specified built-in class)
Operation types: System, which is an internal operation in the VM system, such as loading a class, and a MethodCall, which is the standard case for an operation on a resource, such as using the resource by invoking a method.

Our policy structure allows the specification of tenant specific access policies in a Software-as-a-Service environment. Thus, specific restricted Blue Ruby VMs are able to be created for each separate tenant.

Blue Sec Access Enforcement

All bridge attacks use a Built-in that is delivered with the VM. As all crucial operations in the Blue Ruby environment happens through a Built-in, the goal was to provide a secure sandbox for Ruby implementations of bridges by controlling which Built-in can be used in which application type (e.g. BAdI). The Blue Ruby security manager 314 (see FIG. 3) operates to control the sandbox implementation.

After having analyzed many different implementation approaches (e.g. automatic code extension, VM modification, built-in modification), it was decided to implement a secure class loading approach according to which application types can only use loaded VM objects if there is no explicit negative policy in the policy base. The idea of secured class loading is to create a sandbox when loading built-ins into the VM 308 (see FIG. 3).

According to one embodiment, the loading of built-ins may be secured via 'require' calls. After loading a built-in in a new initialized VM 308 (see FIG. 3), the security manager 314 (see FIG. 3) checks in which application type the loaded built-in type is being requested to be used. If the application type has permissions needed for the attempted access to the built-in, the security manager 314 permits access; otherwise, it denies access. This approach has the advantage that there is less runtime overhead for applications as no security check is required in the application code or built-in code. (A security check may be performed in the application code or built-in code if so desired according to a further embodiment of the present invention.) The only overhead is due to the checks executed when the VM 308 is initialized, which is done only once an application is started.

Each time the Blue Ruby runtime 306 loads a built-in, the Blue Ruby runtime 306 (which acts as the Secure VM Instantiator 318), calls the security manager 314, which acts as the Policy Decision Point (see FIG. 3).

Figure 6:
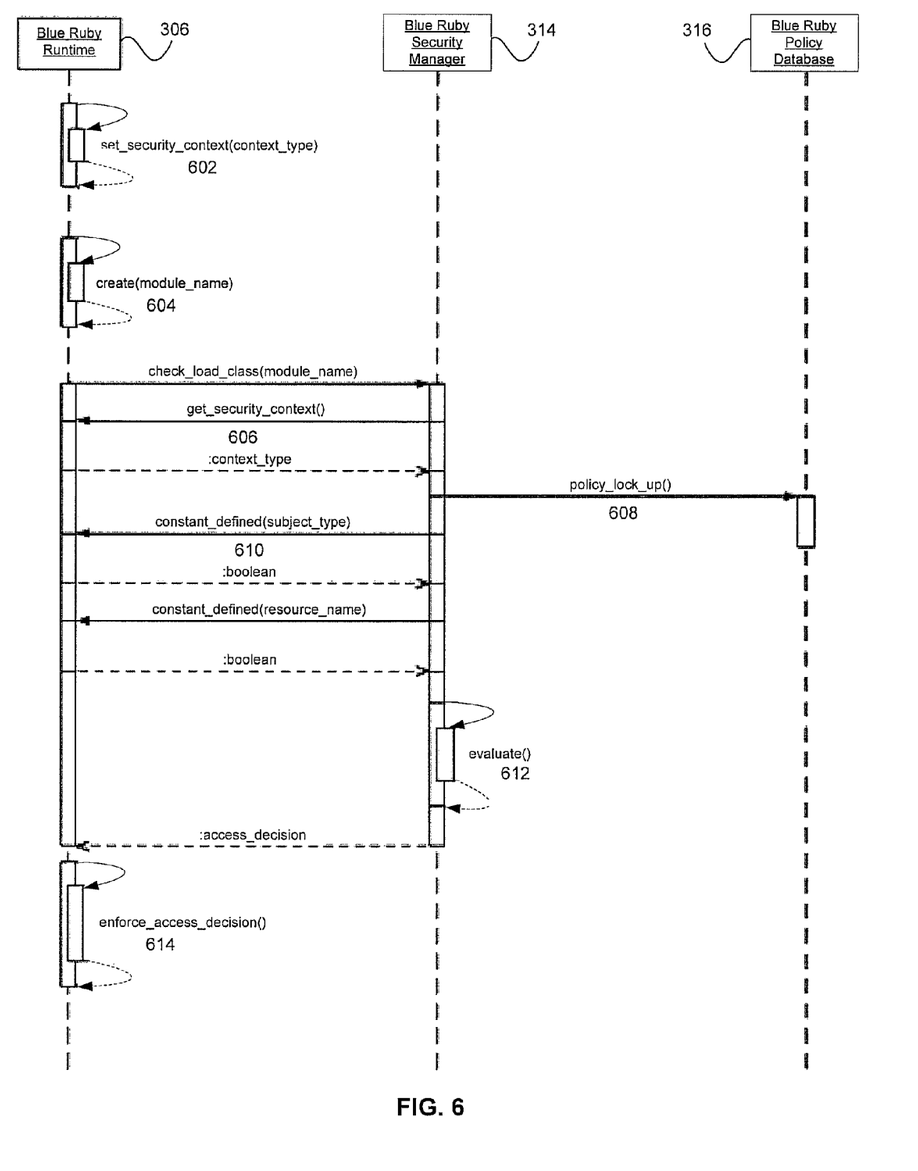
FIG. 6 is a workflow diagram illustrating access enforcement according to an embodiment of the present invention.

FIG. 6 is a workflow diagram illustrating access enforcement according to an embodiment of the present invention. In step 602, the Blue Ruby runtime 306 sets the security context. In step 604, the Blue Ruby runtime 306 creates the module name.

In step 606, the security manager 314 checks whether the security enforcement has been activated by checking the value of the security context. In step 608, the security manager 314 retrieves the negative policies from the policy database 316. In step 610, the security manager 314 checks whether the current state of the initialized VM violates any security policy rule. For each retrieved policy rule, it checks whether subject_type and resource_name are already among loaded the VM objects.

If yes, a security exception occurs. When a security exception—which is a runtime exception—occurs and is not caught, the Blue Ruby virtual machine 308 aborts.

If no, the Blue Ruby runtime 306 continues its normal flow.

In step 614, the Blue Ruby runtime 306 enforces the abovenoted decisions.

Section 4. Security Manager Conclusion

All bridge attacks use a built-in that is delivered with the VM. As all crucial operations in the Blue Ruby environment happens through a built-in, a novel security approach was developed which provides a secure sandbox for Ruby implementations of bridges by controlling which built-in can be used in which bridge type (e.g. BAdI). Our approach allows creating restricted application level virtual machines for different application contexts.

Section 5. Further Embodiment Involving Business Add-Ins

According to a further embodiment, the security manager embodiments described above may also be used when invoking business add-ins (BAdIs).

As discussed above, one goal of the Blue Ruby project is to create an enterprise applications development environment that combines the ease and simplicity of programming in a dynamic programming language—like Ruby—together with the enterprise capabilities of our Web Application Server. Blue Ruby enables developers to run Ruby on the ABAP™ stack of the Web Application Server in a controlled way. The communication between Ruby world and ABAP™ world happens through bridges. Using these bridges, Ruby developers are able to both consume data managed by ABAP™ applications and also extend ABAP™ applications. The Blue Ruby BAdI Bridge allows developer to implement extension points foreseen in ABAP™ applications (the so-called Business AddIns or BAdIs) using the Ruby Language. All necessary meta data for registering the BAdI implementation with SAPs Enhancement Framework can be specified in a simple Ruby DSL. At runtime, the Blue Ruby BAdI Bridge will make all importing and exporting parameters of the ABAP™ BAdI call available to the Ruby implementation.

As mentioned above, developers are under continued pressure to deliver applications faster to keep up with the needs of the businesses that they serve. The use of dynamic languages, together with powerful-yet-simple frameworks for rapidly building web applications, has recently gained significant traction as a way of meeting these challenges.

One goal of the Blue Ruby project is to create an enterprise applications development environment that combines the ease and simplicity of programming in a dynamic programming language—like Ruby—together with the enterprise capabilities of our Web Application Server. Blue Ruby enables developers to run Ruby on the ABAP™ stack of the Web Application Server in a controlled way.

In the first place, Blue Ruby is a Ruby Virtual Machine that runs inside the ABAP™ Web Application Server, but is completely isolated. This means, Blue Ruby code cannot make use of any services/APIs provided inside the same ABAP™ Server. Blue Ruby's application level virtual machine approach prevents Ruby code to break the application server by causing any wanted or unwanted side-effects to ABAP™ applications and their data stored in the underlying database. However, the full power of Blue Ruby only shows when integrating Ruby code with the surrounding ABAP™-based environment. Therefore, Blue Ruby offers several bridges to the ABAP™ world. Using these bridges, Ruby developers are able to both consume data managed by ABAP™ applications and also extend ABAP™ applications.

The SAP Netweaver Enhancement Framework is SAP's modification-free extension technique. Via the BAdIs (Business Add-Ins) provided in the Enhancement Framework, customers can plug in custom coding at places foreseen by SAP application developers by implementing certain ABAP™-Objects Interfaces defined by a BAdI call.

Until now, all BAdI implementation had to be done in the ABAP language. Additionally, meta data had to be entered into SAP Transactions to register a BAdI implementation at the Enhancement Framework.

As further detailed below, according to one embodiment of the present invention, the Blue Ruby BAdI Bridge allows customers to implement BAdIs in the Ruby language, a widely known dynamic language which is very popular in the developers community, because it is so light-weight and flexible.

Blue Ruby is a Virtual Machine for Ruby which runs inside the ABAP™ Application Server—the BAdI bridge closes the gap between ABAP™ programs and Blue Ruby: Via a BAdI call, an ABAP™ program can invoke Ruby code and pass parameters back and forth. Furthermore, the Blue Ruby BAdI bridge replaces the cumbersome registration mechanism by a simple DSL and therefore reduces implementation/testing cycles down to few minutes.

BAdIs are SAP's enhancement concept—a BAdI is basically an exit foreseen by an SAP developer to let others enhance the functionality of his application. The Blue Ruby BAdI bridge is described in more detail later in this document. In a nutshell, the BAdI bridge enables developers outside SAP (e.g. at customers or partners) to implement these enhancement points in Ruby rather than ABAP™.

However, this 2-way integration is not an arbitrary one—Blue Ruby cannot make calls to any piece of ABAP™ code residing on the Web AS and especially Blue Ruby is not able to modify the database directly. Instead, communication with the ABAP™ application is only possible via well-defined interfaces—the bridges. The idea behind this restriction is to open up Blue Ruby for communication with ABAP™ Applications—but only in a very controlled way that protects the Ruby developer from breaking the underlying platform.

Blue Ruby Bridges are implemented as libraries, which can be included into a Ruby program via the "require" statement. For example to make RFC calls, one would simply include the relevant bridge by calling 'require Rfc' in the Ruby program—this will offer a class for executing RFC-enabled function modules and passing along the parameters. These libraries are developed in ABAP™, need to implement certain interfaces required by the Blue Ruby Runtime and need to be registered with the Blue Ruby Runtime to be visible to Ruby application developers.

Section 6. Blue Ruby BAdI Bridge

BAdIs (Business Add-Ins) are noteworthy code extension techniques used to adapt SAP software to specific requirements and, since NetWeaver 7.00, are part of the new Enhancement Framework. BAdIs are traditionally implemented in ABAP™. One goal of the Blue Ruby BAdI Bridge is to provide a convenient way to implement ABAP BAdIs in Ruby. As Blue Ruby adds the power of dynamic languages to the ABAP™ runtime, developers can use Ruby to implement their BAdI functionality. The Blue Ruby BAdI Bridge will take care about the instantiation of the Blue Ruby VM when necessary and is able to pass parameters from the embedding ABAP™ program to the Blue Ruby BAdI implementation and vice versa.

BAdIs in a Nutshell

BAdIs are SAP's enhancement concept that allows plugging custom code into pre-defined enhancement points without modification of the underlying system. BAdIs are widely used within the SAP Business Suite to provide modification-free enhancement options for industry development and/or customers.

Figure 7:
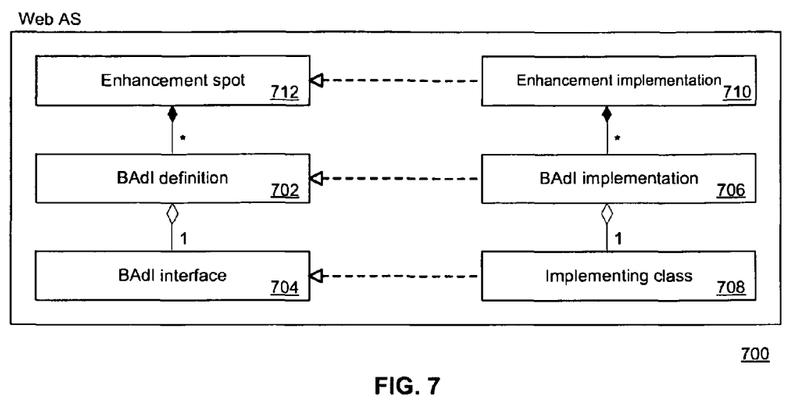
FIG. 7 is a block diagram showing BAdIs in the ABAP™ Enhancement Framework.

FIG. 7 is a block diagram showing BAdIs in the ABAP™ Enhancement Framework 700. BAdIs are an object-oriented enhancement option, embedded into the ABAP™ Enhancement Framework 700. A BAdI definition 702 defines an interface 704 that can be implemented by BAdI-implementations 706, which are basically ABAP™ classes 708 implementing the defined interface 704. Within the ABAP™ source code of an application, a call to a BAdI is an explicit enhancement option 710 which may be defined by the developer of the original application (usually an application developer at SAP) as an enhancement spot 712—BAdI implementations may be used in places where such a 'hook' 712 is available. BAdI developers (usually not the developers of the original application) can add implementations to that hook which are found and called at runtime of the application. Multiple implementations can be added to one hook 712. Depending on additional metadata exactly one of them or all of them will be called at runtime. A definition of a BAdI consists of a descriptive meta data part (the so-called Enhancement Spot 712 and BAdI Definition 702) and an ABAP™ Interface which determines the methods available in the BAdI and the parameters that are passed from the surrounding ABAP™ application to the BAdI and back from the BAdI to the ABAP™ application. A BAdI is implemented by providing an ABAP™ class 708, implementing the corresponding ABAP Interface, and registered at the Enhancement Framework via meta data (the so-called Enhancement Implementation 710 and BAdI Implementation 706), which tells the system how to find the implementing class and—in case multiple implementations are provided for one single BAdI definition—which implementation to run.

Implementing a BAdI in Ruby

Implementing a BAdI in Blue Ruby may be done in a manner similar to implementing any Ruby class—following the common Ruby paradigm 'convention over configuration', the names of the methods in that class may just be the same names as defined in the BAdI interface.

A special registration library is offered for automatic creation of the metadata entries in the ABAP™ application server when a ruby-based BAdI implementation is uploaded—in addition to uploading the compiled BRIL code to the chosen ABAP™ system, this option will also register the class as a BAdI implementation—the metadata for the Enhancement Implementation and BAdI Implementation is written down in a simple DSL and automatically created in the Enhancement Framework tables.

Figure 8:
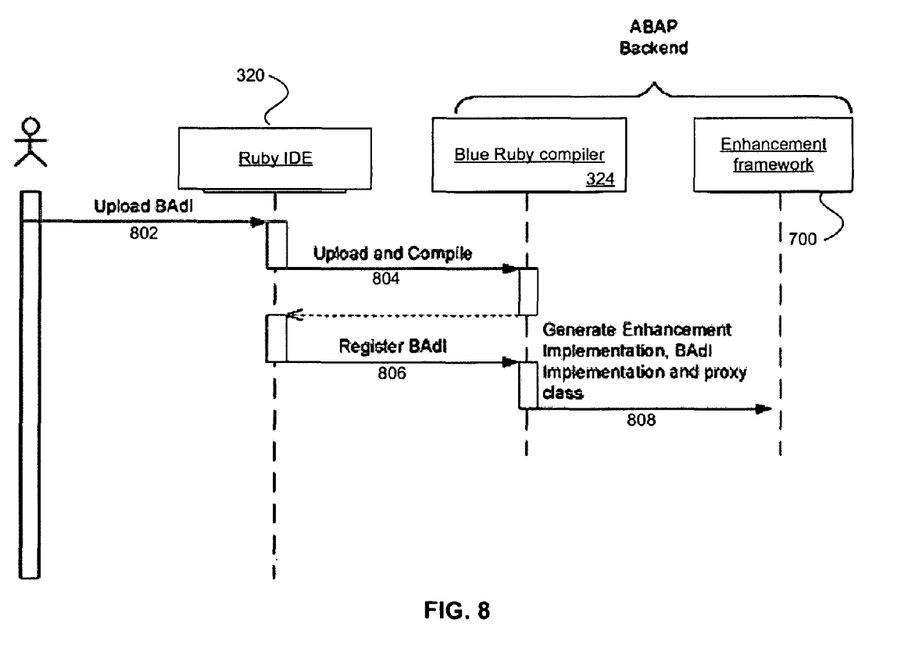
FIG. 8 is a workflow diagram that illustrates the uploading process according to an embodiment of the present invention.

FIG. 8 is a workflow diagram that illustrates the uploading process. In step 802, the user uploads the BAdI to the Ruby IDE 320. In step 804, the Ruby IDE 320 uploads and compiles the BAdI via the Blue Ruby compiler 324. In step 806, the Ruby IDE 320 registers the BAdI with the Blue Ruby compiler 324. In step 808, the Blue Ruby compiler 324 generates the enhancement implementation, the BAdI implementation and the proxy class for the Enhancement Framework 700.

Furthermore, an ABAP class is generated which serves as a proxy to the Blue Ruby BAdI implementation—remember, a BAdI implementation is required to be an ABAP™ Class, implementing the ABAP™ Interface assigned to the BAdI Definition. The purpose of this generated proxy class is to map the parameters passed into the BAdI methods to corresponding Ruby classes, invoke the Blue Ruby implementation and eventually map the result back to ABAP™ parameters (in case the BAdI method returns something to the calling ABAP™ program).

Figure 9:
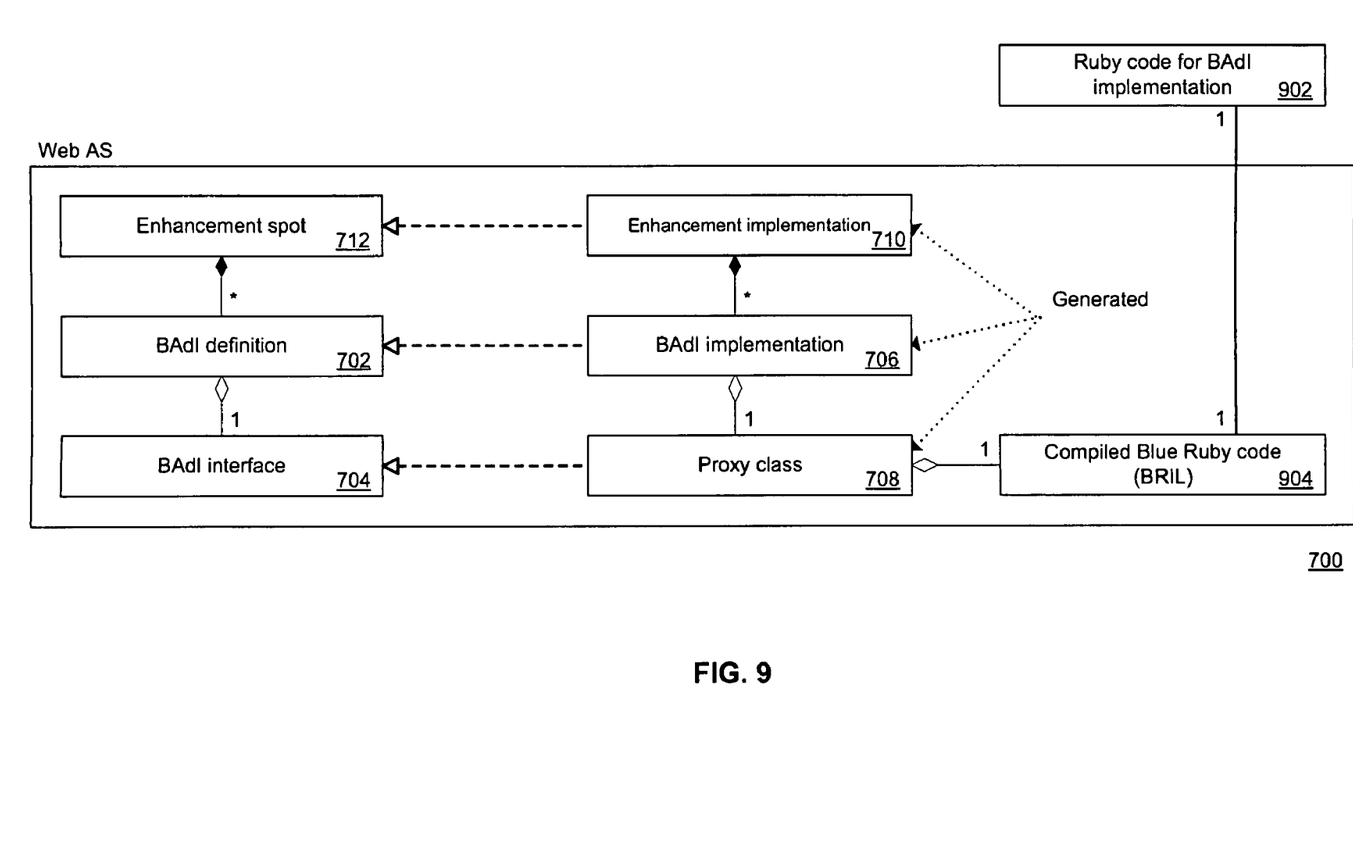
FIG. 9 is a block diagram showing a specific implementation for a BAdI implemented in Blue Ruby according to an embodiment of the present invention.

FIG. 9 is a block diagram showing a specific implementation for a BAdI implemented in Blue Ruby (as compared to the general description of FIG. 7). The Blue Ruby code 902 for the BAdI implementation is compiled into the compiled Blue Ruby class 904. The proxy class 706 is generated from the compiled Blue Ruby class 904, and the BAdI implementation 708 and the enhancement implementation 710 are also generated.

As mentioned before, registration of a Blue Ruby BAdI implementation is done via a simple DSL which in turn is implemented in Ruby. To register the Ruby class MyBadiImpl as implementation of the ABAP™ BAdI MY_BADI, a developer would simple write this short script and execute it in Blue Ruby:

```
require 'Badi'
class MyBadiImplementation < Badi
  badiName 'MY_BADI'
  rubyClass 'MyBadiImpl'
end
MyBadiImplementation.register
```

Further parameters (such as name of the Ruby source code file) can, but need not be specified—if not specified, the BAdI Bridge will use defaults (e.g. /badi/<nameOfRubyClass>.rb for the source code file).

Blue Ruby BAdIs at Runtime

Figure 10:
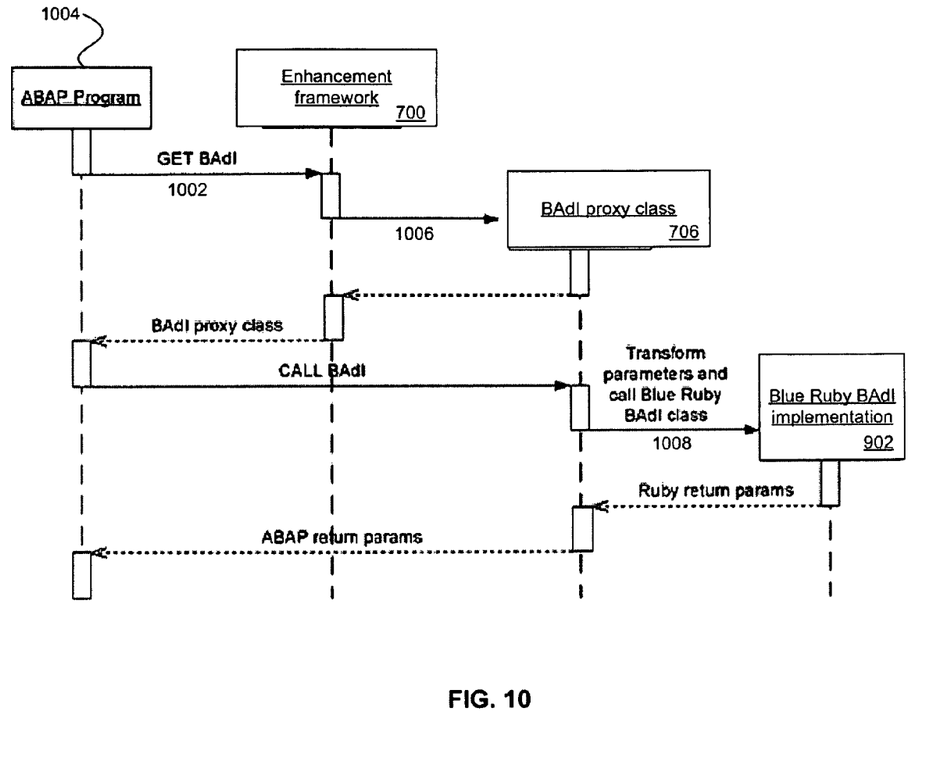
FIG. 10 is a workflow diagram illustrating the process of invoking a Blue Ruby BAdI implementation according to an embodiment of the present invention.

FIG. 10 is a workflow diagram illustrating the process of invoking a Blue Ruby BAdI implementation according to an embodiment of the present invention. In step 1002, the ABAP program 1004 provides the BAdI to the enhancement framework 700.

In step 1006, when a BAdI is called during runtime of the ABAP™ program 1004, the Enhancement Framework 700 will look up the relevant implementation in its registry and refer the call to the corresponding ABAP™ implementation class. In case of a BAdI implemented in Blue Ruby, this implementation class is the proxy class 706 which was generated as part of the BAdI upload.

In step 1008, the proxy class 706 will forward the call, together with its parameter values to the compiled BRIL code 904 (the Blue Ruby BAdI implementation) which is then executed in the Blue Ruby VM 308 (see FIG. 3). After the execution of the Ruby code has finished, the proxy class 706 maps the result contained in the Ruby object response back to the corresponding ABAP™ parameter and returns control to the calling ABAP™ program.

Section 7. BAdI Conclusion

The Blue Ruby BAdI Bridge can highly simplify the extension of ABAP™ applications with customer-specific code. Not only does the Blue Ruby BAdI Bridge offer the first alternative programming language for BAdI implementation—until recently, ABAP™ was the only option—the BAdI upload via DSL also shields developers from having to register their implementation manually using the existing ABAP™ tools. Via the BAdI registration DSL, all meta data required for registration of a BAdI implementation can be created with a very small script.

The method parameters defined in the BAdI interface can be passed between the surrounding ABAP™ program and the Ruby class extending the ABAP™ program, the BAdI Bridge will take care of the mapping between the two worlds. As Blue Ruby runs inside the ABAP™ Virtual Machine, this mapping is a local one which does not require any marshalling/unmarshalling or network traffic.

The BAdI Bridge supports all meta data settings that are offered by the SAP Netweaver Enhancement Framework, such as multiple implementations for one BAdI definition or filters on BAdI implementations.

A similar bridge may be implemented for any code extension framework that is based on the concepts of interfaces and extension classes implementing these interfaces as well as meta data driven extension registration (e.g. via manifest files). Although ABAP™ BAdIs are one example implementation of a code enhancement bridge, other—similar—implementations could extend e.g. AP Business Objects or any application framework that foresees customer extensions.

Figure 11:
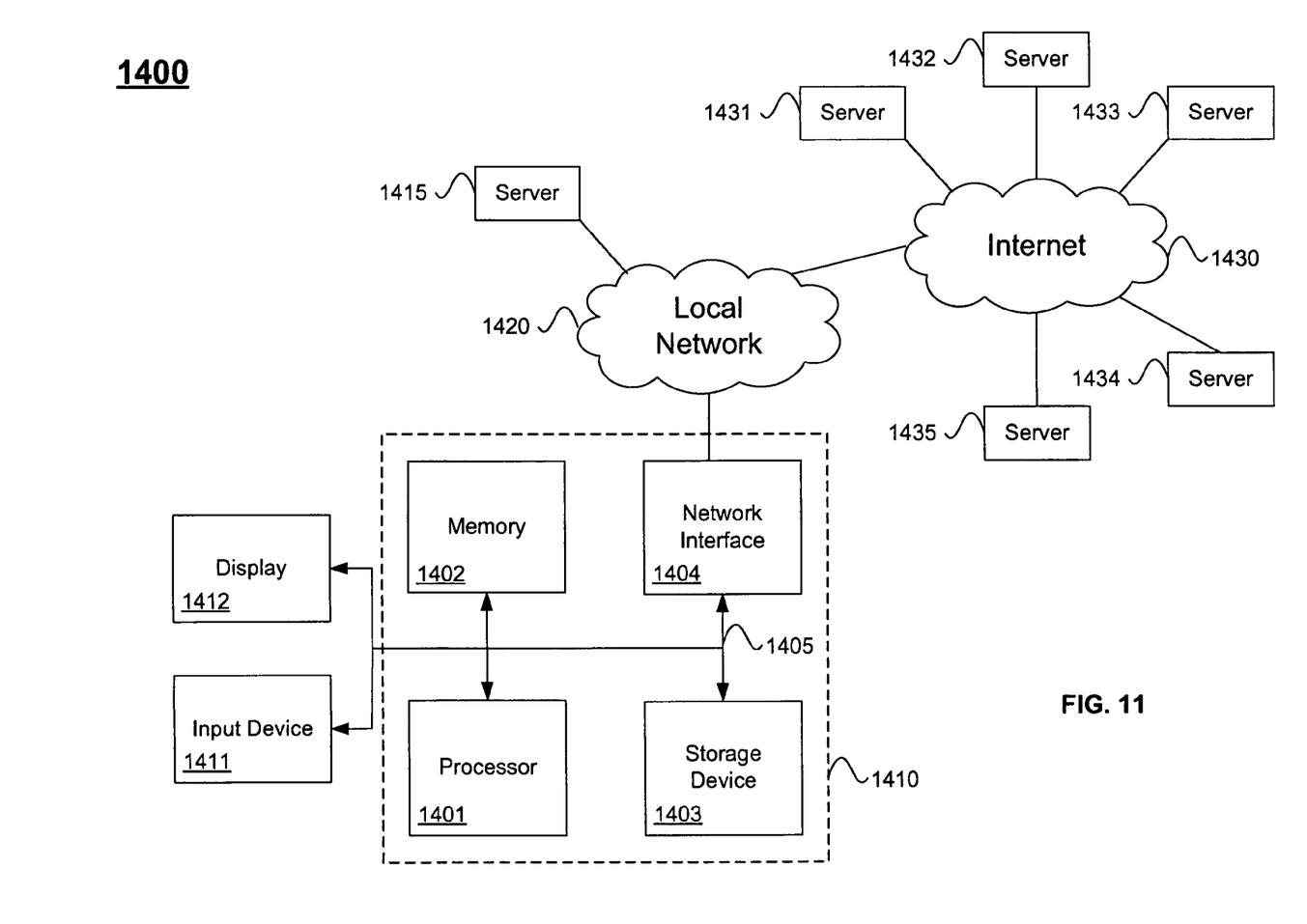
FIG. 11 is a block diagram of an example computer system and network 1400 for implementing embodiments of the present invention.

FIG. 11 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

Embodiments of the present invention may include one or more of the following features. First, the policies are defined in a dynamic scripting language by using a domain specific language. The policies are then stored in a database table controlled by the non-dynamic programming environment (for example, the ABAP™ Application Server).

Second, one embodiment allows the specification of negative policies. Each time the runtime instantiates a VM, the runtime uses the policy enforcement to check which built-ins are allowed to be used in the VM.

Third, in one embodiment security policies are implemented at the application level, which may be contrasted with other types of security that operate at the language level (for example, the Java™ VM as understood).

Fourth, in one embodiment the invention may be used to create tenant specific VMs in a Software-as-a-Service Environment.

In the example embodiments discussed above, a specific dynamic programming environment (Ruby language) and a specific non-dynamic programming environment (ABAP™ language) are detailed. It is to be understood that the principles of the present invention may be applied in similar manners to other types of dynamic programming environments and to other non-dynamic programming environments.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of maintaining security in a dynamic programming environment, comprising the steps of:

defining a policy between the dynamic programming environment and a non-dynamic programming environment;
at runtime of a dynamic program in the dynamic programming environment, when the dynamic program indicates access to an application managed by the non-dynamic programming environment, referencing the policy to permit the dynamic program to access the application; and
executing the dynamic program to access the application having been permitted;
registering, in the non-dynamic programming environment, an add-in program written in the dynamic programming environment, resulting in a registered add-in program, wherein the step of registering comprises generating an enhancement implementation, an add-in implementation, and a proxy class related to the registered add-in program in the non-dynamic programming environment; and
executing the add-in program in the dynamic programming environment when the registered add-in program is referenced in the non-dynamic programming environment,
wherein the step of referencing the policy comprises:
invoking a security manager, in the dynamic programming environment, that interfaces between a plurality of secured bridges and a plurality of applications, wherein the plurality of applications includes the application, wherein the security manager is implemented in a Ruby language,
determining, by the security manager in the dynamic programming environment, whether the policy permits access to the application,
checking, by the security manager, whether security enhancement has been activated,
accessing, by the security manager, the policy, and
aborting from the dynamic program when the policy conflicts with the dynamic program.

2. The computer-implemented method of claim 1, wherein the application managed by the non-dynamic programming environment includes at least one of data managed by the non-dynamic programming environment, a business add-in managed by the non-dynamic programming environment, a remote function call managed by the non-dynamic programming environment, and a business object managed by the non-dynamic programming environment.

3. The computer-implemented method of claim 1, wherein the step of defining the policy comprises:
defining an extension library that maps a plurality of execution properties related to the dynamic program to a plurality of access permissions.

4. The computer-implemented method of claim 1, wherein the step of defining the policy comprises:
defining the policy, using a second dynamic program, between the dynamic programming environment and the non-dynamic programming environment.

5. The computer-implemented method of claim 1, wherein the step of defining the policy comprises:
defining a subject type and a subject name related to the policy;
defining an object type and an object name related to the policy; and
defining an operation type and an operation name related to the policy.

6. The computer-implemented method of claim 1, wherein the application is one of a plurality of applications, wherein the step of executing the dynamic program comprises:
executing the dynamic program to access the plurality of applications having been permitted.

7. The computer-implemented method of claim 1, wherein the step of executing the add-in program comprises:
transferring input parameters from the non-dynamic programming environment to the dynamic programming environment;
using the input parameters to execute the add-in program in the dynamic programming environment;
generating output parameters resulting from executing the add-in program in the dynamic programming environment; and
transferring the output parameters from the dynamic programming environment to the non-dynamic programming environment.

8. A computer system including software to maintain security in a dynamic programming environment, comprising:
a storage device that is configured to store the software; and
a processor that is configured to execute the software, wherein the software comprises:
a policy data structure software file that defines a policy between the dynamic programming environment and a non-dynamic programming environment;
a security manager software file that, at runtime of a dynamic program in the dynamic programming environment, when the dynamic program indicates access to an application managed by the non-dynamic programming environment, references the policy to permit the dynamic program to access the application;
a virtual machine software file that executes the dynamic program to access the application having been permitted; and
a registration library software file that is configured to register, in the non-dynamic programming environment, an add-in program written in the dynamic programming environment, resulting in a registered add-in program, wherein the registration library software file is configured to generate an enhancement implementation, an add-in implementation, and a proxy class related to the registered add-in program in the non-dynamic programming environment,
wherein the virtual machine software file is configured to execute the add-in program in the dynamic programming environment when the registered add-in program is referenced in the non-dynamic programming environment,
wherein security manager software file is implemented in the dynamic programming environment,
wherein the security manager software file is configured to interface between a plurality secured bridges and a plurality of applications, wherein the plurality of applications includes the application, wherein the security manager software file is implemented in a Ruby language,
wherein the security manager software file is configured to determine whether the policy permits access to the application,
wherein the security manager software file is configured to check whether security enhancement has been activated,
wherein the security manager software file is configured to access the policy, and
wherein the security manager software file is configured to aborting from the dynamic program when the policy conflicts with the dynamic program.

9. The computer system of claim 8, wherein the policy data structure software file defines an extension library that maps a plurality of execution properties related to the dynamic program to a plurality of access permissions.

10. The computer system of claim 8, wherein the virtual machine software file further:

transfers input parameters from the non-dynamic programming environment to the dynamic programming environment;

uses the input parameters to execute the add-in program in the dynamic programming environment;

generates output parameters resulting from executing the add-in program in the dynamic programming environment; and transfers the output parameters from the dynamic programming environment to the non-dynamic programming environment.

11. The computer system of claim 8, wherein the application managed by the non-dynamic programming environment includes at least one of data managed by the non-dynamic programming environment, a business add-in managed by the non-dynamic programming environment, a remote function call managed by the non-dynamic programming environment, and a business object managed by the non-dynamic programming environment.

12. The computer system of claim 8, wherein the policy data structure software file is configured to define the policy using a second dynamic program between the dynamic programming environment and the non-dynamic programming environment.

13. The computer system of claim 8, wherein the policy data structure software file is configured to define the policy by:

defining a subject type and a subject name related to the policy;

defining an object type and an object name related to the policy; and defining an operation type and an operation name related to the policy.

14. The computer system of claim 8, wherein the application is one of a plurality of applications, wherein the virtual machine software file is configured to execute the dynamic program to access the plurality of applications having been permitted.

15. A non-transitory computer-readable medium having recorded thereon software to maintain security in a dynamic programming environment, the software comprising:

a policy data structure software file that defines a policy between the dynamic programming environment and a non-dynamic programming environment;

a security manager software file that, at runtime of a dynamic program in the dynamic programming environment, when the dynamic program indicates access to an application managed by the non-dynamic programming environment, references the policy to permit the dynamic program to access the application;

a virtual machine software file that executes the dynamic program to access the application having been permitted; and a registration library software file that is configured to register, in the non-dynamic programming environment, an add-in program written in the dynamic programming environment, resulting in a registered add-in program, wherein the registration library software file is configured to generate an enhancement implementation, an add-in implementation, and a proxy class related to the registered add-in program in the non-dynamic programming environment, wherein the virtual machine software file is configured to execute the add-in program in the dynamic programming environment when the registered add-in program is referenced in the non-dynamic programming environment, wherein security manager software file is implemented in the dynamic programming environment, wherein the security manager software file is configured to interface between a plurality secured brides and a plurality of applications, wherein the plurality of applications includes the application, wherein the security manager software file is implemented in a Ruby language, wherein the security manager software file is configured to determine whether the policy permits access to the application, wherein the security manager software file is configured to check whether security enhancement has been activated, wherein the security manager software file is configured to access the policy, and wherein the security manager software file is configured to aborting from the dynamic program when the policy conflicts with the dynamic program.

16. The non-transitory computer-readable medium of claim 15, wherein the application managed by the non-dynamic programming environment includes at least one of data managed by the non-dynamic programming environment, a business add-in managed by the non-dynamic programming environment, a remote function call managed by the non-dynamic programming environment, and a business object managed by the non-dynamic programming environment.

17. The non-transitory computer-readable medium of claim 15, wherein the policy data structure software file is configured to define an extension library that maps a plurality of execution properties related to the dynamic program to a plurality of access permissions.

18. The non-transitory computer-readable medium of claim 15, wherein the policy data structure software file is configured to define the policy, using a second dynamic program, between the dynamic programming environment and the non-dynamic programming environment.

19. The non-transitory computer-readable medium of claim 15, wherein the application is one of a plurality of applications, wherein the virtual machine software file is configured to execute the dynamic program to access the plurality of applications having been permitted.

20. The non-transitory computer-readable medium of claim 15, wherein the virtual machine software file further:

transfers input parameters from the non-dynamic programming environment to the dynamic programming environment;

uses the input parameters to execute the add-in program in the dynamic programming environment;

generates output parameters resulting from executing the add-in program in the dynamic programming environment; and transfers the output parameters from the dynamic programming environment to the non-dynamic programming environment.

* * * * *